April 9, 1968 F. H. DICKEY ETAL 3,376,709
SEPARATION OF ACID GASES FROM NATURAL GAS BY SOLIDIFICATION
Filed July 14, 1965 2 Sheets-Sheet 1

INVENTOR.
CARL F. CROWNOVER
FRANK H. DICKEY
BY
ATTORNEY

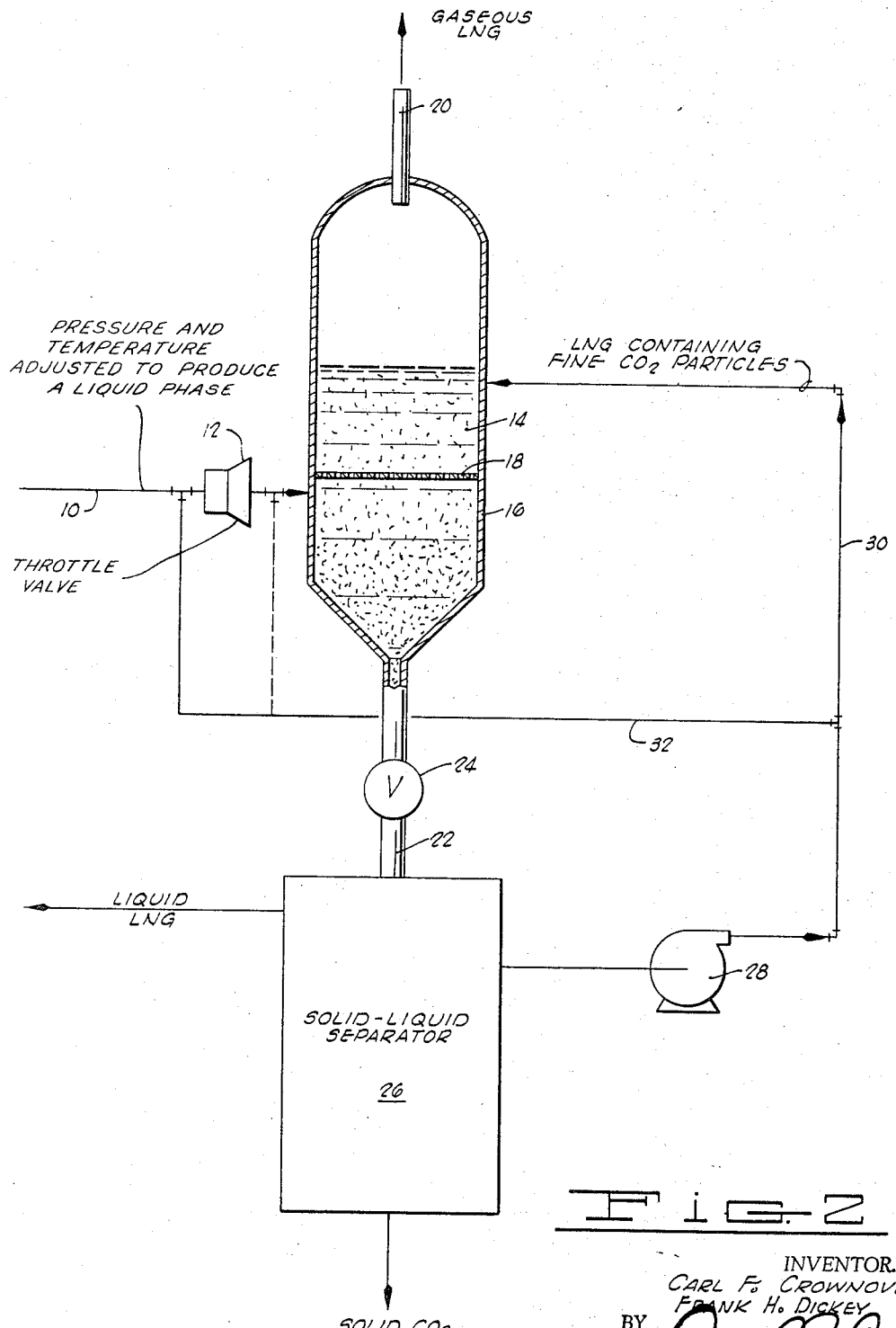

3,376,709
SEPARATION OF ACID GASES FROM NATURAL GAS BY SOLIDIFICATION
Frank H. Dickey, 135 Main St., Seal Beach, Calif. 90740, and Carl F. Crownover, 209 N. Stephen, Ponca City, Okla. 74601
Filed July 14, 1965, Ser. No. 471,961
4 Claims. (Cl. 62—12)

ABSTRACT OF THE DISCLOSURE

Acid gas components are removed from natural gas containing same by a process which comprises providing the feed natural gas at conditions of pressure and temperature as to constitute a liquid solution, reducing the pressure on the solution to produce a mixture consisting of solid, liquid, and vapor phases, immediately contacting the mixture with liquid natural gas containing solid acid gas particles, and removing solid acid gas particles therefrom.

---

This invention relates to processes for the purification of natural gas preparatory to liquefaction. More specifically, the invention relates to improvements in the removal of acid gas impurities from natural gas via low temperature solid-liquid separation processes.

In natural gas liquefaction procedures, it is necessary to remove the acid gases (carbon dioxide and hydrogen sulfide) from the natural gas prior to liquefaction and storage of the gas because these acid gases reduce the fuel value of the natural gas, impart an undesirable odor to the gas and result in corrosion of treating and handling equipment. The removal of the acid gases, at least to an acceptably low level, has been previously effected by the use of low temperature solid-liquid separation in which the acid gases are frozen to solids and then separated from the liquid natural gas by gravity, filtration or other procedure. Methods of accomplishing such low temperature separation are described in Kurata U.S. Patents 2,900,797 and 2,901,396 and Tung U.S. Patent 2,996,891.

In general, the previously proposed procedures involving low temperature separation of acid gases from natural gas entail a throttling step in which the impurity-containing natural gas is throttled from a pressure and temperature at which a single liquid phase exists to a lower temperature and pressure at which the carbon dioxide and hydrogen sulfide freeze out to yield a slurry of solid acid gas and liquid natural gas from which the acid gases can then be separated. Some of the natural gas is flashed or vaporized by the throttling procedure and is vented from the slurry.

Two problems have continued to characterize low temperature solid-liquid separations of the type described. One of these is the difficulty of efficiently separating the solid acid gas particles from the liquefied natural gas following the throttling step. This difficulty is due to the physical properties of the solid particles which are formed in the slurries. The solidified acid gases have been observed to form aggregates made up of loosely bound, small particles. These aggregates settle very slowly from the liquefied natural gas, and are sufficiently porous and occupy a bulk volume such that the denser, removed material includes only 30 mole percent solidified acid gases. The remaining 70 mole percent of the material which cannot be removed from the separated solids by gravity separation constitutes entrained liquefied natural gas. Attempts to expedite the rate of settling and improve efficiency of the separation by the use of hydrocyclone separators have not been entirely successful because the high shear forces inherent in the hydrocyclone mechanism tend to break down the aggregates to particles smaller in size than the hydrocyclone is capable of separating.

A second major difficulty which has characterized low temperature solid-liquid separations of acid gases from liquefied natural gas has been the result of entrainment of a portion of the solid acid gas particles in the natural gas vapor which results from the throttling procedure. As a result of the presence of these very fine solid particles of the acid gases which are entrained in the vaporized natural gas, the solids tend to deposit on vessel walls and in pipelines contacted by the vapor as the vapor is withdrawn from the throttling equipment, and in any equipment which may be provided to contain the liquid-solid slurry formed upon throttling. An additional portion of the entrained solid acid gases is deposited in downstream valves and lines when friction and orifice effects cause a small pressure drop in the flowing stream of gas. Under these circumstances, it becomes difficult and costly to clean up such lines and valves.

The present invention is directed to the improvement of the described processes for separating acid gases from natural gas at low temperatures using a throttling procedure to convert the acid gases to the solid state. The improvements which are effected by the invention relate primarily to the rate and ease of separation of the solid acid gas particles from the liquefied natural gas in the slurry which is formed upon throttling, and the prevention of entrainment of significant quantities of solidified acid gas in the overhead natural gas vapor which is withdrawn from the slurry following the throttling procedure.

Broadly described, the present invention comprises initially cooling the mixture of natural gas containing undesirably large amounts of acid gases to a temperature and relatively high pressure such that the mixture exists as a liquid solution of the acid gases in liquefied natural gas. In this state, all of the acid gases are in solution in the liquefied natural gas. The single phase liquid mixture is then expanded through a throttling device to a relatively low pressure and decreased temperature such that there are concurrently formed, solid, liquid and vapor phases with substantially all of the acid gas impurity being converted to the solid state and the predominance of the liquid and vapor phases being natural gas. The expansion through the throttling device is carried out so that the effluent from the device including the solid, liquid and vapor phases are immediately introduced to a slurry comprising a liquid phase consisting essentially of natural gas, and a solid phase consisting of small particles of the acid gases which are present in the natural gas mixture which is to be purified. The expansion from the throttling device is caused to occur below the surface of the slurry.

As a result of the occurrence of the expansion in the presence of the existing relatively small particles of solid acid gases in the body of the slurry, nucleation sites are provided which permit relatively large compact particles or crystals to be formed as the acid gases are frozen out of the natural gas mixture by expansion through the throttling valve. Throttling the mixture into the slurry thus results in better control of the particle size of the acid gas solids which are formed upon expansion, and permits denser and larger size particles to be formed which will separate more rapidly from the liquefied natural gas.

The expansion of the liquefied natural gas-acid gas solution through the throttling valve and beneath the surface of the slurry also affords the advantage of scrubbing the natural gas vapor produced by the expansion as this vapor bubbles upwardly through the body of the slurry. The scrubbing action effects the removal of a substantial portion of any solid particles of acid gas which may be entrained in the vapor and thus reduces or eliminates the problem of depositing of these solids on vessel walls, or restriction and choking of orifices and pipelines downstream from the separation equipment.

In a preferred embodiment of the invention, a portion of the slurry into which the liquid mixture is expanded through the throttling valve is continuously withdrawn from the main body of the slurry and directed to a suitable solid-liquid separation device in which the solid particles of acid gas are separated from the liquefied natural gas by any suitable procedure, such as gravity settling or the like. From the solid-liquid separator, a portion of the slurry which contains relatively fine solid particles of the acid gas is removed and is recycled to the zone containing the body of the slurry into which the mixture to be separated is expanded after passage through the throttling valve. In this manner, the size of the solid particles in the slurry and constituting nucleation sites can be more carefully controlled so as to permit the rate and extent of growth of larger crystals or agglomerates in the slurry to be controlled as desired.

From the foregoing description of the invention, it will have become apparent that it is a major object of the present invention to provide an improved procedure for separating acid gases from natural gas which is to be liquefied.

An additional object of the invention is to provide an improved low temperature procedure for separating acid gases from natural gas by a solid-liquid separation technique in which the solidified acid gases may be more rapidly and efficiently separated from the liquefied natural gas formed after expanding the mixture through a throttling device.

Another object of the present invention is to reduce the amount of solid particles of acid gases which is carried over or entrained in the vaporized natural gas resulting after expansion of a mixture of natural gas and acid gases through a throttling device in the course of a low temperature purification of natural gas.

A further object of the invention is to provide a low temperature gas-solid separation procedure for purifying natural gas, which procedure avoids the deposition of solids from the natural gas vapor phase occurring subsequently to removal of the vapor phase from the separation zone.

A further object of the present invention is to provide an improved degree of control over the size and character of the particles of acid gas formed after a liquid solution of acid gas and natural gas has been expanded through a throttling device for the purpose of effecting separation of these materials.

In addition to the foregoing described objects and advantages of the invention, additional objects and advantages will become apparent as the following detailed description of the invention is read in conjunction with the accompanying drawings which illustrate certain aspects of the invention.

In the drawings:

FIGURE 2 is a schematic illustration of one embodiment of the apparatus which can be provided for carrying out the process of the invention.

Figure 1:
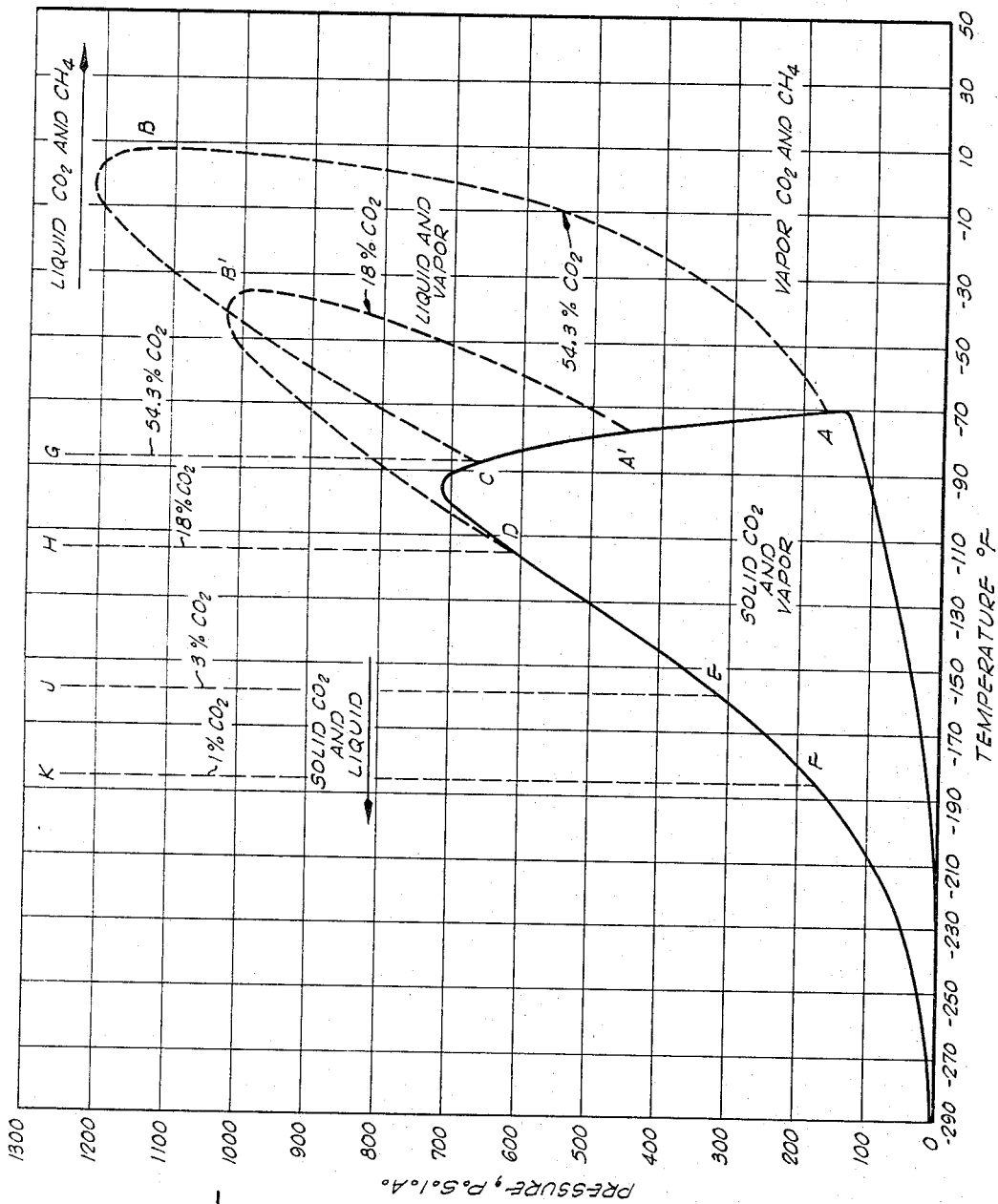
FIGURE 1 is a pressure-temperature phase diagram of a carbon dioxide-methane system.

Since the practice of the present invention depends in large part upon the phase behavior under varying conditions of temperature and pressure of a system which includes natural gas, and relatively small amounts (less than 20 mole percent) of acid gases, the discussion will initially be directed to a pressure-temperature phase diagram which typifies a system of this sort. In the ensuing description, the carbon dioxide-methane system will be considered by way of example since methane constitutes by far the major component of natural gas and the carbon dioxide behaves representatively of the acid gases (primarily carbon dioxide and hydrogen sulfide) which are to be removed from the natural gas.

In FIGURE 1, curve ABC is the curve for vapor-liquid equilibrium in a carbon dioxide-methane system containing 54.3 mole percent $CO_2$, and curve A′B′D is the curve for vapor-liquid equilibrium in a $CO_2$-methane system containing 18 mole percent carbon dioxide. The region under curve ACDEF represents the conditions of temperature and pressure where gas and solid phases occur in equilibrium. Lines CG, DH, EJ and FK are solid-liquid equilibrium boundary lines for various

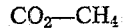

compositions. To the right of these lines the system exists as a single liquid phase, whereas to the left of the lines the system exists as a solid $CO_2$ phase and a liquid phase. On the curve ACDEF, the three phases are in coexistence and in equilibrium. As the amount of $CO_2$ in the mixture is decreased, the point of intersection of the vapor-liquid equilibrium curve (similar to curves ABC and A′B′D) with the univariant vapor-liquid-solid equilibrium curve ACDEF moves to the left, as does the corresponding vertical solid-liquid equilibrium boundary line. Therefore, as the amount of $CO_2$ in the mixture decreases, a single-phase, entirely liquid system can be maintained at relatively lower temperatures and pressures, i.e., to the right of the applicable vertically extending solid-liquid equilibrium line and above the univariant three-phase equilibrium line. Thus, in referring to FIGURE 1, it will be perceived that a single liquid phase will exist at about $-115°$ F. and about 650 p.s.i.a. for a $CO_2$—$CH_4$ system containing 18 percent $CO_2$, whereas it is possible to maintain a single liquid phase at about $-185°$ F. and about 180 p.s.i.a. in a system containing only 1 percent $CO_2$.

If a $CO_2$—$CH_4$ system containing but a single phase which is liquid is reduced in pressure until a pressure and temperature on the univariant three-phase equilibrium curve is reached, solid, liquid and gaseous phases will then come into coexistence and will remain in equilibrium as long as the pressure and temperature values remain on the three-phase equilibrium line. When a mixture in the form of a single liquid pulse, and at a temperature equivalent to some temperature on the positive slope portion (that is, below about $-100°$ F.) of the univariant three-phase equilibrium curve ACDEF is reduced in pressure, once the temperature and pressure of the system reach values on the univariant three-phase equilibrium curve, further reduction in pressure, unless accompanied by isothermal control of the temperature of the system, will result in the three-phase locus being followed downwardly accompanied by decreasing temperature in the system, and the continued existence of three phases in equilibrium. Thus, non-isothermal expansion of a single liquid phase system to atmospheric pressure results in the ultimate establishment of three phases in equilibrium at a temperature of $-258°$ F. (see FIGURE 1), provided the expansion is commenced while the liquid is at some temperature corresponding to some temperature on the positive slope portion of the univariant three-phase equilibrium curve.

In the initial step of the process of the present invention, the natural gas system containing acid gas in quantities of less than about 30 mole percent is compressed and cooled to provide a single liquid phase. The temperature and pressure of the liquid are adjusted so as to lie to the right of the vertically extending solid-liquid equilibrium boundary line which corresponds to the acid gas composition of the system, and above the positive slope portion of the univariant three-phase equilibrium curve ACDEF.

The liquefied natural gas containing the impurity acid gases which are to be removed is then expanded non-isothermally and preferably adiabatically to a pressure and temperature such that the solid, liquid and gaseous phases, exist in equilibrium. Preferably, in the course of the expansion, the pressure is reduced to atmospheric pressure. The desired expansion or pressure reduction can be accomplished using a simple throttling valve, such as those described in the patents hereinbefore cited.

Upon suddenly expanding the cold liquefied natural gas, the solid phase which is produced concurrently with the liquid and vapor phases consists of minute particles of solid acid gases. The particles are intimately mixed with the liquid phase which consists essentially of relatively pure natural gas which, of course, contains methane as the major component.

For the purpose of better controlling the agglomerating characteristics of the solid particles of acid gas, and to reduce the extent to which the solid particles are entrained in the vapor phase which is removed from the system as relatively pure natural gas, the process of the invention contemplates the expansion of the liquefied, impurity-containing natural gas directly into a body of a slurry comprising solid particles of the acid gases dispersed in liquefied natural gas. The solid particles in the slurry at the point of introduction of the expanded mixture are relatively small (in the range of from about 0.005 to about 5 microns, depending upon the particular acid gases involved). These particles act as nucleation sites, taking up acid gas from the supersaturated solution which is formed by, and exists for a brief time after, the expansion, and preventing the formation of any new crystals from this supersaturated solution. A result of this contact of the slurry particles with the supersaturated solution is the occurrence of crystal growth involving the slurry particles to produce large, relatively dense particles which can be more easily separated by gravity, centrifugation or filtration from the liquefied natural gas. The point of introduction into the body of the slurry of the materials yielded upon expansion is preferably well below the surface of the slurry. In this way, the time of contact between the slurry liquid and the vapor phase formed upon expansion is prolonged, and the natural gas vapor is thoroughly scrubbed as it rises upwardly through the slurry. Very little solid acid gas is entrained in the relatively pure gas which is taken overhead from the separation apparatus, and plugging or obstruction of pipes and valves at downstream locations by deposition of solidified acid gases is obviated.

In a preferred embodiment of the invention, a portion of the slurry material is continuously withdrawn from the body of the slurry at a level which is below the point of introduction of the expanded mixture thereinto. The portion of the slurry material withdrawn is preferably such that the rate of withdrawal from the body of the slurry is from about 1.2 to about 3 times the rate of introduction thereinto of liquid and solid materials from the expansion procedure in order to accommodate the recycling procedure hereinafter described. The withdrawn portion is passed into a settling tank or other suitable gravity separating device in which it is permitted to stand quiescently to permit the solid acid gas particles to settle out of the liquefied natural gas. A small portion of the mixture in the settling tank is continuously withdrawn therefrom at a level near the top of the tank, and is recycled to the body of the slurry at a rate of withdrawal and recycling corresponding substantially to the difference between the rate of withdrawal of the portion of slurry from the bottom of the slurry containing vessel or tank for passage to the settling tank and the rate of addition of liquid and solid to the body of the slurry by expansion of the impure natural gas mixture thereinto. In this way, the size and concentration of the solid acid gas particles in the slurry and constituting nucleation sites as previously described can be controlled to obtain optimum particle growth. Typically, the rate of withdrawal of the settling tank mixture for recycling to the body of the slurry is from about 0.2 to about 2 times the rate of introduction of the supersaturated solution from the expansion device into the body of slurry. In any event, it is most desirable to correlate the rates of introduction of material from the expansion step into the body of the slurry, the rate of introduction of the portion of the slurry from the main body thereof into the settling tank, and the rate of recycling of material from the settling tank to the body of slurry so that the liquid level within the container holding the body of the slurry is maintained substantially constant and a substantially quiescent state is maintained in the slurry in the settling tank.

The level from which recycled slurry material is withdrawn from the settling tank is preferably selected so that the average particle size of the majority of the solid acid gas particles recycled to the main body of the slurry is from about 0.001 micron to about 2 microns. With differing compositions of impure liquefied natural gas being expanded into the slurry, however, selection of the point of removal of the recycled material from the settling tank may be varied to alter the average size of particles removed therefrom to provide optimum crystal growth and separation in the main body of the slurry.

One form of the apparatus which can be employed in the process of the invention is illustrated in FIG. 2 of the drawings. A liquefied natural gas containing an undesirably high level of acid gas impurity is introduced via a conduit 10 to a throttling valve 12 for purposes of expansion in the manner hereinbefore described. Prior to passing through the throttling valve 12, the temperature and pressure of the liquefied natural gas have been adjusted so that the single liquid phase exists at a temperature above the positive slope portion of the univariant, three phase equilibrium curve, and to the right of the applicable solid-liquid equilibrium line which extends vertically from the univariant, three phase equilibrium curve.

Upon passing through the throttling valve 12, the pressure on the impure liquefied natural gas is suddenly reduced with the result that the system is brought to a condition of temperature and pressure corresponding to a temperature and pressure at some point on the univariant, three phase equilibrium line ACDEF illustrated in FIGURE 1. By carrying out the expansion in the preferred adiabatic fashion, the temperature and pressure of the system decrease, and follow downwardly and to the left, the univariant, three phase equilibrium curve. In the most preferred manner of practicing the invention, the liquid is expanded to atmospheric pressure and at such pressure, the temperature of the system will be about $-258°$ F. Expansion of the impure natural gas system through the throttling valve 12 results, of course, in the concurrent production of solid, liquid and gaseous phases. To prevent the solid acid gas particles which are formed from choking or plugging the expansion valve, the valve may be provided with a suitable heating element (not shown) in accordance with procedures well understood in the art.

Immediately after the expanded mixture leaves the valve 12, and while it is still a supersaturated solution of acid gases in liquid natural gas, it is introduced into a slurry 14 contained in a suitable vessel 16. The effluent from the throttling valve 12 is introduced to slurry 14 at a point well below the surface of the slurry (typically from 3 to 8 feet), and preferably below a diffuser screen or grate 18 which extends transversely across the vessel 16 as illustrated in FIGURE 2. The slurry 14 contains relatively pure natural gas, and dispersed particles of acid gases which are graduated in distribution within the slurry so that the relatively fine particles are distributed in the top of the body of the slurry, and the coarser particles are to be found at a greater depth. At the point where the effluent from the throttling valve 12 is introduced into the slurry, the solid acid gas particles in the slurry are preferably from about 0.005 to about 5 microns in size.

The molecularly dispersed particles of acid gas formed upon throttling of the liquefied, impure natural gas are, for a very short time period after throttling, retained in solution in the liquid natural gas as a supersaturated solution. Before solid particles of acid gas precipitate from the unstable, supersaturated solution, the molecular dispersed acid gas contacts the solid particles in the slurry, and these particles build up in the nature of growing crystals to form larger particles having a high density, and being more readily separable from the liquefied natural gas.

The vapor which is formed upon throttling passes upwardly through the body of the slurry 14 and is taken overhead by means of a suitable vapor pipe 20. In passing through the body of the slurry, the gaseous natural gas is thoroughly scrubbed by contact with the liquefied natural gas. Thus, the natural gas taken overhead from the container 16 is relatively pure and carries a minimum amount of entrained solid material.

As previously indicated, a preferred method of practicing the invention contemplates control of the size of the particles in the slurry 14 by recycling from downstream separation equipment, a mixture of liquid natural gas and solid acid gas particles in which the concentration and particle size of the acid gas particles is selectively controlled. The apparatus which is utilized in carrying out this aspect of the invention is also illustrated in FIGURE 2 of the drawings. From the container 16, a portion of the slurry is continuously withdrawn from the bottom of the container through a discharge conduit 22. The discharge conduit 22 contains a valve 24 which permits the rate of withdrawal of the slurry from the container 16 to be controlled, or to be completely stopped, if desired. The portion of the slurry 14 which is continuously withdrawn from the container 16 is introduced to a settling tank or other suitable solid-liquid gravity separator 26.

In the solid-liquid gravity separator 26, the slurry is permitted to stand quiescently so that the relatively dense particles which have been formed in the container 16 can gravitate in the separator and accumulate at the bottom thereof. The solid acid gas particles typically settle at the rate of from 1 to 3 cm./second in the liquid natural gas in the settling tank, and the length of time the material will be permitted to stand quiescently before removing the solids accumulated in the bottom will generally be dependent on the size of the settling tank. This accumulated solid can be subsequently removed by techniques well understood in the art. A small portion of the slurry contained in the solid-liquid gravity separator 26 is withdrawn from near the top thereof by means of a suitable pump 28 and is recycled via a conduit 30 to a point near the surface of the body of the slurry 14 in the container 16. At the level from which slurry is withdrawn from the solid-liquid gravity separator 26, the size of the solid acid gas particles is relatively small, typically from about 0.001 to about 2 microns, and thus these particles are more suitable for acting as nucleation sites in the slurry 14 in the container 16. The concentration and average particle size of the particles in the slurry 14 can thus be controlled by selecting the level of the slurry in the solid-liquid gravity separator 26 from which the recycle material will be withdrawn.

Where the throttling valve 12 is not itself disposed in the container 16, it is preferable to withdraw a small slip stream of the recycle slurry from the conduit 30 through the conduit 32 and introduce this slip stream to the effluent from the throttling valve 12 at a point as close to the throttling valve as possible. Preferably, the slip stream conduit 32 is connected to the conduit 10 immediately upstream from the throttling valve 12, although the apparatus is also operative if the slip stream is introduced immediately downstream from the throttling valve as shown by the dashed line in FIGURE 2. By the use of the slip stream, the opportunity for solid particles to form following the throttling step is minimized. It should be pointed out, however, that it is highly desirable to located the throttling valve as close to the slurry 14 as possible, and the optimum location is a point immersed in, or actually located in contact with, the slurry.

Since the volume of vapor which is produced upon expansion of the impure liquefied natural gas through the throttling valve 12 is quite large and is produced very rapidly, it is desirable to provide some type of baffle or diffusing device in the path of the vapor flow through the slurry 14 in order to prevent undesirably large gas bubbles from being formed in the slurry. To this end, the grate or screen 18 is positioned transversely across the container 16 in the path of the rising vapor, and functions to break up the vapor into relatively small gas bubbles and thereby improve the scrubbing efficiency of the system.

As an example of the practice of the invention, 100 moles of a mixture containing 99 mole percent methane and 1 mole percent carbon dioxide is compressed to 180 p.s.i.a. and reduced to a temperature of −185° F. At this temperature and pressure, the mixture exists as a single liquid phase. The mixture is then passed through a throttling valve where it is throttled to atmospheric pressure (15 p.s.i.a.) and is reduced in temperature to −258° F. As a result of the expansion, solid and gaseous phases are formed. 84.6 moles of the liquid remain and 14.4 moles of the vapor are evolved. 0.80 mole of solid carbon dioxide is formed with about 0.2 mole of the carbon dioxide being dissolved in the liquid or existing in the vapor phase.

The effluent from the throttling valve is passed immediately into a slurry containing fine particles of carbon dioxide having an average particle size of about 0.5 micron at the point of introduction of the effluent. The vapor formed upon expansion is passed through approximately 5 feet of the slurry in rising to the surface thereof, and is then taken overhead from the slurry container. Upon analysis the amount of solid carbon dioxide found to be entrained in the vapor is less than 0.01 mole percent. The slurry which is formed after passing the effluent from the throttling valve through the body of the slurry can be easily separated into its liquid and solid phases.

From the foregoing detailed description, it will be perceived that the present invention provides an improved procedure for purifying natural gas prior to liquefaction by the removal therefrom of a substantial portion of the acid gas impurities. The vapor produced in low temperature solid-liquid acid gas separation procedures as heretofore employed can be easily removed from the separation equipment without any substantial plating out or deposition of solid acid gas particles resulting. As contrasted with previously used procedures on which deleterious quantities of solid acid gases are carried overhead with the gaseous methane which is evolved, and in which the efficiency with which the solid particles of acid gases can be separated from the liquefied natural gas is quite low, highly efficient separation of the acid gases from both the gaseous and liquid natural gas can be effected.

Although certain preferred embodiments of the invention have been described in order to provide examples of the practice of the invention, specific disclosures of temperatures, pressures and materials utilized are not to be considered as limitations upon the true spirit and scope of the invention. Thus, although the phase behavior of the carbon dioxide-methane system has been described in detail in order to illustrate the basic principles which underlie the invention, the usefulness of the invention is not limited to this specific system, and it is contemplated that the well-known similarities of phase behavior of other acid gases, such as hydrogen sulfide, found in natural gas, to the behavior of carbon dioxide, and the well-known predominance of methane as a constituent of natural gas, make it apparent that the invention is equally applicable to the removal of other acid gases from natural gas. Therefore, in view of the exemplary nature of the foregoing description, and the applicability of the inventive principles disclosed herein to other systems and under other conditions of operation, it is intended that the spirit and scope of the invention be limited only by the appended claims or reasonable equivalents thereof.

What is claimed is:

1. The method of separating acid gas from natural gas which comprises:
   (a) adjusting the temperature and pressure of the mixture of natural gas and acid gas to values such that the mixture exists as a single liquid phase having a temperature corresponding to a temperature on the positive slope portion of the solid-liquid-vapor equilibrium curve for the system;
   (b) reducing the pressure on the mixture to solidify the acid gas and concurrently produce liquid and vapor phases;
   (c) immediately after said pressure reduction, passing the mixture into the body of a slurry, hereinafter provided in step (d), consisting essentially of liquefied natural gas having an effective amount of solid particles of acid gas suspended therein, said passing being below a diffusion screen in said body;
   (d) subsequently separating the slurry of step (c) into a liquefied natural gas of greatly reduced acid gas content and a slurry containing solid particles of acid gas; and
   (e) returning a portion of the slurry produced in step (d) to the body of slurry of step (c).

2. The process of claim 1 wherein another portion of the slurry produced by the separating of step (d) is added to the mixture prior to said reducing of step (b).

3. The process of claim 1 wherein another portion of the slurry produced by the separating of step (d) is added to the mixture subsequent to the reducing of step (b) but prior to the passing of step (c).

4. The method of separating acid gas from natural gas which comprises:
   (a) adjusting the temperature and pressure of the mixture of natural gas and acid gas to values such that the mixture exists as a single liquid phase having a temperature corresponding to a temperature on the positive slope portion of the solid-liquid-vapor equilibrium curve for the system;
   (b) admixing with the mixture of step (a) a slurry, hereinafter provided in step (e), consisting essentially of liquefied natural gas having an effective amount of solid particles of acid gas suspended therein;
   (c) reducing the pressure on the thus-admixed stream to solidify additional acid gas and concurrently produce liquid and vapor phases;
   (d) immediately after said pressure reduction, passing the mixture into a body of said slurry below a diffusion screen therein;
   (e) subsequently separating the slurry of step (d) into a liquefied natural gas of greatly reduced acid gas content and a slurry containing solid particles of acid gas; and
   (f) returning a portion of the slurry produced in step (e) to the admixing of step (b).

References Cited

UNITED STATES PATENTS

| | | | |
|---|---|---|---|
| 2,900,797 | 8/1959 | Kurata et al. | 62—12 |
| 2,901,326 | 8/1959 | Kurata et al. | 62—12 X |
| 2,996,891 | 8/1961 | Tung | 62—12 |
| 3,224,208 | 12/1965 | Schlumberger et al. | 62—12 |
| 3,312,073 | 4/1967 | Jackson et al. | 62—12 X |

NORMAN YUDKOFF, *Primary Examiner.*

WILBUR L. BASCOMB, JR., *Examiner.*

V. W. PRETKA, *Assistant Examiner.*